INVENTOR:
HAROLD O. CADMAN
BY: James E. Nilles
ATTORNEY

Nov. 25, 1969   H. O. CADMAN   3,479,957
POSITIVE DISPLACEMENT GEAR TYPE PUMP
Filed May 2, 1968   2 Sheets-Sheet 2

INVENTOR:
HAROLD O. CADMAN
BY: James E. Nilles
ATTORNEY

United States Patent Office 3,479,957
Patented Nov. 25, 1969

3,479,957
POSITIVE DISPLACEMENT GEAR TYPE PUMP
Harold O. Cadman, Rockton, Ill., assignor to
Louis A. M. Phelan, Roscoe, Ill.
Filed May 2, 1968, Ser. No. 726,117
Int. Cl. F04b *13/02;* F04c *1/04;* F16h *1/02*
U.S. Cl. 103—2                    5 Claims

ABSTRACT OF THE DISCLOSURE

A positive displacement, fluid pump having two gears with constant mesh teeth, the gears being supported only around their peripheries by the bores in which they are located.

BACKGROUND OF THE INVENTION

The invention pertains generally to that type of pump having two gears with constant mesh teeth that convey the fluid. The gears are each located and rotate in a bore in the pump housing, and the gear teeth cooperate with the cylindrical wall of the bores to convey the fluid between the teeth of a gear as the gear rotates.

Prior art gear type pumps of this character have been inefficient, costly to manufacture and have had considerable wear problems, due for one thing, to the journalling required for the gears. This journalling usually comprised center supporting shafts for the gears and/or bearings on the outside of the pump which were not only difficult to manufacture with extreme precision but they also interfered with the proper meshing of the gear teeth and caused undesirable pressure therebetween. Difficulty was also encountered in precisely aligning the center shafts and their gears and at the same time maintaining precise, sliding and sealing relationship between the periphery or peak of the gear teeth and the cylindrical surface of the bore in which they were mounted.

SUMMARY OF THE INVENTION

The present invention provides a positive displacement, gear type, fluid pump in which the two constant mesh gears which convey the fluid are centrally unsupported and instead are supported for rotation only by the peaks of their teeth bearing in precise relationship with and against the cylindrical wall of the bores in which they are located and rotate. The arrangement is such that there is no pressure or binding on the gears due to a central mounting shaft or external bearings, and the pressure build up between the opposite teeth of the gears as they mesh actually insures that the gears precisely seal against the cylindrical wall of their bores.

Another aspect of the invention relates to the shape and location of the outlet and inlet ports which provide exceptionally good pump efficiency and negligible axial pressure which tends to lift off the pump side wall. As a result, only one tie bolt is required to hold the pump in assembled relationship.

The invention also is directed to a pump body containing the pockets or bores in which the gears rotate, and also containing the pump outlet, which construction results in a pump body that can be manufactured with extreme accuracy.

The present invention provides a positive displacement, gear type pump which can be manufactured with extreme accuracy at a reasonable cost, is highly efficient in its pumping action, requires a minimum of maintenance and has virtually no wear problems.

These and other objects and advantages of the present invention will appear hereinafter as this disclosure progresses, reference being had to the accompanying drawings.

DESCRIPTION OF THE PREFERRED EMBODIMENT

Figure 1:
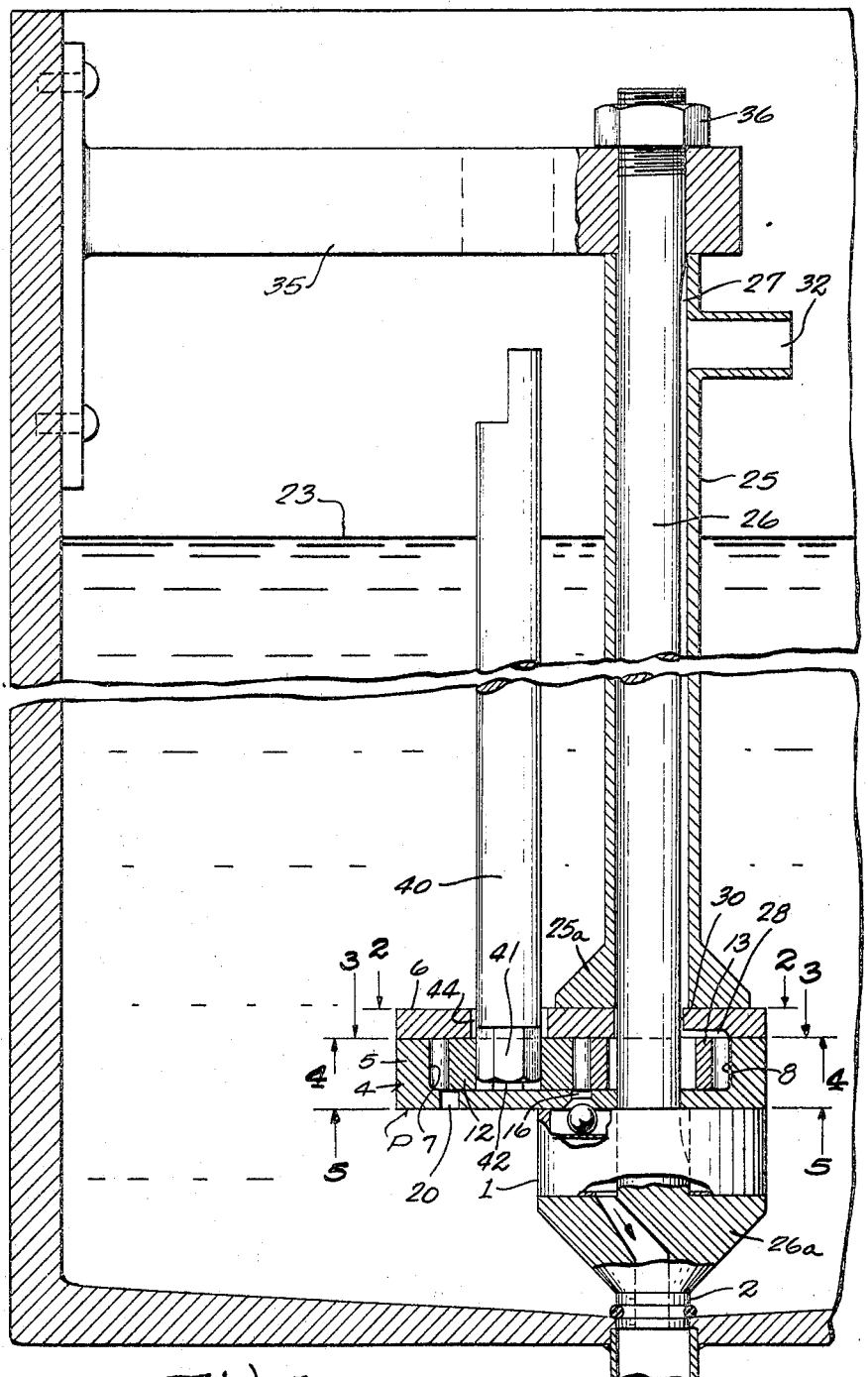
FIGURE 1 is an elevational view, in section, showing the pump of the present invention installed in a tank of fluid.
Figure 2:
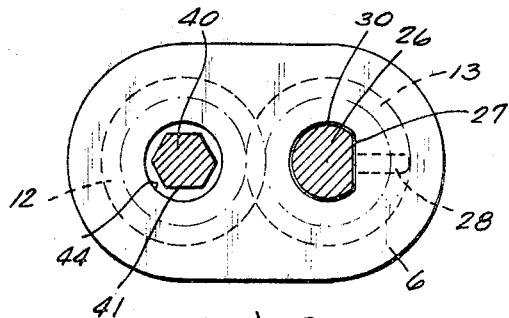
FIGURE 2 is a cross sectional view taken along line 2—2 in FIGURE 1.
Figure 3:
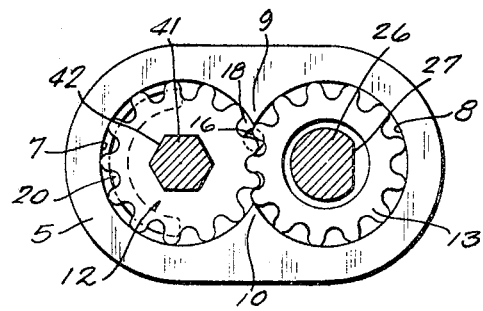
FIGURE 3 is a cross sectional view taken along line 3—3 in FIGURE 1.
Figure 5:
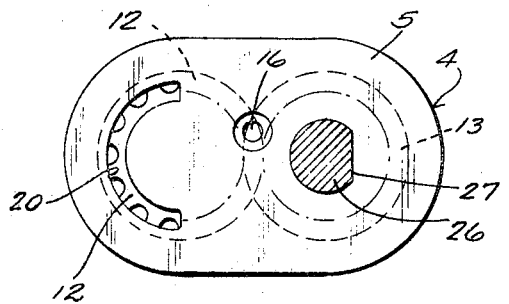
FIGURE 5 is a cross sectional view taken along line 5—5 in FIGURE 1.
Figure 4:
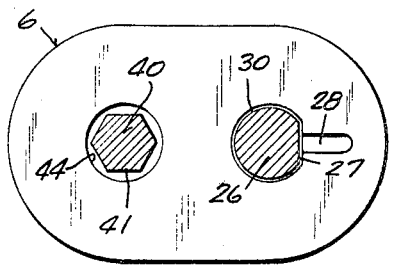
FIGURE 4 is a cross sectional view taken along line 4—4 in FIGURE 1.

The positive displacement, gear type pump P is shown as attached to a part 1 into which the pump discharges. Part 1 then in turn discharges the fluid via the conduit 2 which extends axially therefrom. As the invention is directed to the pump per se, it is not believed necesssary to refer in detail to part 1 which receives the fluid discharged from the pump at high pressure.

The pump P includes a body 4 comprised of a main housing 5 and an end cap 6 which fits over the housing and can be rigidly secured therewith. The housing defines two bores 7 and 8 which are arranged in side by side relationship and which merge together. The juncture of the merger of the bores is defined by the pointed portions 9 and 10 formed in the housing. The bores 7 and 8 do not extend entirely through the housing and thereby define cylindrical bores or pockets in which gears 12 and 13 of the pump are located for rotation therein.

The gears have teeth which are in constant mesh at the juncture of the bores. The outer edges of the teeth are formed generally as arcs 14 and are then slightly curved on their outermost portion to form a larger radius 15 that complements the abutting surface of the respective bores in which they are mounted.

One end corner of the gear teeth is formed as a slight radius (FIGURE 1) to closely fit the complementary shaped corner of the inner end of the bores. This rounded construction facilitates the manufacturing of the one-piece housing, facilities compliance with sanitation regulations as does the general rounded contours of the base of the gear teeth.

It is important to note that the gear teeth themselves form the mounting for rotatably supporting the gears in the housing and the gears are centrally unsupported. The peaks of the gear teeth abut precisely against the cylindrical surface of the respective bore in which they rotate. In manufacturing the housing and gears, once the center distance between the bores has been reasonably established as correct, then it is only necessary to grind the tooth peaks close to 0.0001 of an inch. With the present construction there is no appreciable wear on the pump ports.

Figure 6:
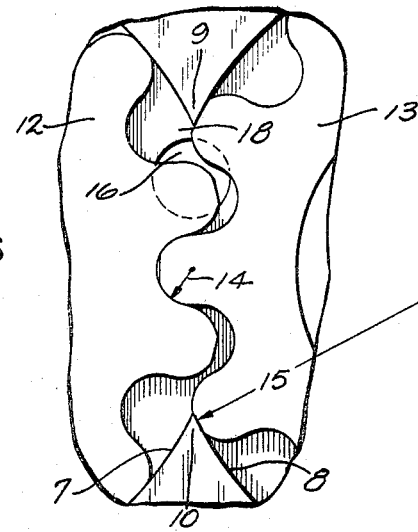
FIGURE 6 is an enlarged fragmentary view of the central portion of FIGURE 3.

The pump housing 5 also has a common outlet 16 located in it adjacent the juncture of the merger of the bores. Stated otherwise, the outlet 16 is in overlying relationship with the meshed teeth of both gears at the pressure side of the juncture of the gear teeth. As the gears rotate in the direction shown by the curvilinear arrows in FIGURE 6, the pressure of the fluid builds up in the area 18 of the meshing gear teeth, and the action of the meshing teeth forces the fluid from the housing and through the outlet 16 at high pressures. It will be noted that the sharp portion 9 of the housing extends well into the pressure area. This resulting small pressure area acting on the cover plate permits the use of only one tie bolt means or shaft for holding the pump assembled, as will appear.

The pressure built up between the teeth of the two gears forces the gears apart and into perfect sealing relationship with the opposite sides of the bores, leaving only a lubrication film of the fluid between the peaks of the teeth and the respective cylindrical bore surface.

With the above construction, the center portions of the gears are fit rather loosely with their shafts, as will appear, and this "play" between the gears and shafts prevents wear, twisting or binding of the gears.

By having the two bores 7 and 8, and also the outlet 16 formed in the one-piece housing 5, much greater accuracy has been obtained in locating the outlet relative to the bores.

Two separate fluid inlets are provided for the pump, one outlet feeding the space between the teeth of each gear. With the present pump, different fluids can be metered together and thoroughly mixed, or a single fluid source can be used to feed both inlets, now to be referred to.

The inlet 20 for gear 12 is also formed in the housing 5 and is a slot of arcuate shape which registers with the path of the gear teeth of gear 12. The slot 20 is approximately 180 degrees in length but can be of various lengths. As the space between the gear teeth must be filled in only a small fraction of a second as they pass the fluid inlet, the slot shaped opening insures complete filling of the space between the teeth as they sweep by the inlet. The width of the slot is such that it only registers with about one-half the height of the gear teeth, and this relationship has proved to be very efficient, although variation of slot width may be found desirable also.

In any event, the slot and teeth act as a self-cleaning strainer of any foreign matter that may be in the fluid, that is to say, the foreign matter, if it does pass partially through the slot and gear teeth juncture, is sheared and ground up.

For purposes of illustrating the invention, the pump has been shown as being submersed in a tank of fluid 23 so that the inlet 20 can draw in the fluid.

The other inlet for gear 13 has been shown as an air inlet, whereby the pump can mix the fluid 23 and air. The air is introduced from a location about the level of the liquid and through the space between an outer tube 25 and an inner shaft 26. Shaft 26 may have an axial groove 27 extending along its length to insure an adequate supply of air. The end cap 6 of the pump body has a recess 28 formed in its inner surface and which places the space between tube 25 and shaft 26 in communication with the space between the teeth of gear 13. It will be noted that shaft 26 passes loosely through the hole 30 formed through the end cap. Referring to the other end of tube 25, a nipple 32 extends therefrom for introducing air into the space between tube 25 and shaft 26. The opening in nipple 32 may be of different cross sectional areas to vary or meter the amount of fluid entering the pump and to be mixed with the fluid entering the pump via the other inlet 20.

A stationary brace 35 surrounds the shaft 26 and the end of the shaft 26 has a threaded nut 36 which holds the pump in position.

The tube 25 has a flange 25a at its other end which forms a good support against the pump cap 6. The shaft 26 has a flange 26a fixed at its other end for abutting against the part 1. When nut 36 is tightened, it forces tube 25 tightly against the pump and holds the entire assembly together.

One of the gears 13 is driven by a drive shaft 40 which has a noncircular end 41 that forms a rather loose driving connection with a complementary opening 42 in the gear 13. Shaft 40 extends loosely through an opening 44 in the end cap 6. As the flat sides of the gears sealingly engage the housing 5 and end cap 6, other seals are unnecessary. Shaft 40 can be readily removed from the pump simply by withdrawing it axially from engagement with the central opening in gear 13. The shaft 40 can be driven in any suitable manner, as by an electric motor (not shown).

I claim:

1. A positive displacement, gear type pump comprising a body defining a pair of bores arranged in side-by-side and merging relationship, a gear in each of said bores and having teeth in constant mesh, the outer peripheral edge of the teeth of said gears bearing against the cylindrical surface of their respective bores to form a bearing surface therewith for sole rotatable support thereby, said gears being centrally unsupported, an inlet in said body and in communication with the gear teeth of one gear whereby a fluid is conveyed by said one gear, a second inlet in said body in communication with the gear teeth of the other gear whereby a fluid is conveyed by said other gear, and a common outlet in said body and in communication with the teeth of both gears for receiving and discharging the fluid conveyed by said gears, said common outlet located at the pressure side of the juncture of said gear teeth whereby the pressure tends to push said centrally unsupported gears apart.

2. The pump set forth in claim 1 in which said body comprises a main housing and an end cap, said bores and common outlet being located in said main housing.

3. The pump claimed in claim 2 and including a shaft which extends centrally through one of said gears and in unsupporting relationship therewith, said shaft having means for securing said end cap to said main housing.

4. The pump described in claim 1 including a drive shaft for one of said gears and forming a detachable driving connection with a center portion of said one of said gears and in unsupporting relationship therewith.

5. A pump as defined in claim 1 further characterized in that one of said inlets is formed as an arcuate slot in registry with the path of the adjacent gear teeth.

References Cited

UNITED STATES PATENTS

| 2,400,485 | 5/1946 | Cardillo. | |
| 2,993,450 | 7/1961 | Weigert. | |
| 2,997,960 | 8/1961 | Kimijima et al. | |
| 3,420,180 | 1/1969 | Behrends et al. | 103—2 |
| 3,437,048 | 4/1969 | Noell et al. | 103—126 |

DONLEY J. STOCKING, Primary Examiner

W. J. KRAUSS, Assistant Examiner

U.S. Cl. X.R.

74—412, 414; 103—126